April 6, 1954     L. ANTONELLI     2,674,342
APPARATUS FOR REVERSE FLOW CLEANING OF FILTERS
Filed March 22, 1951.
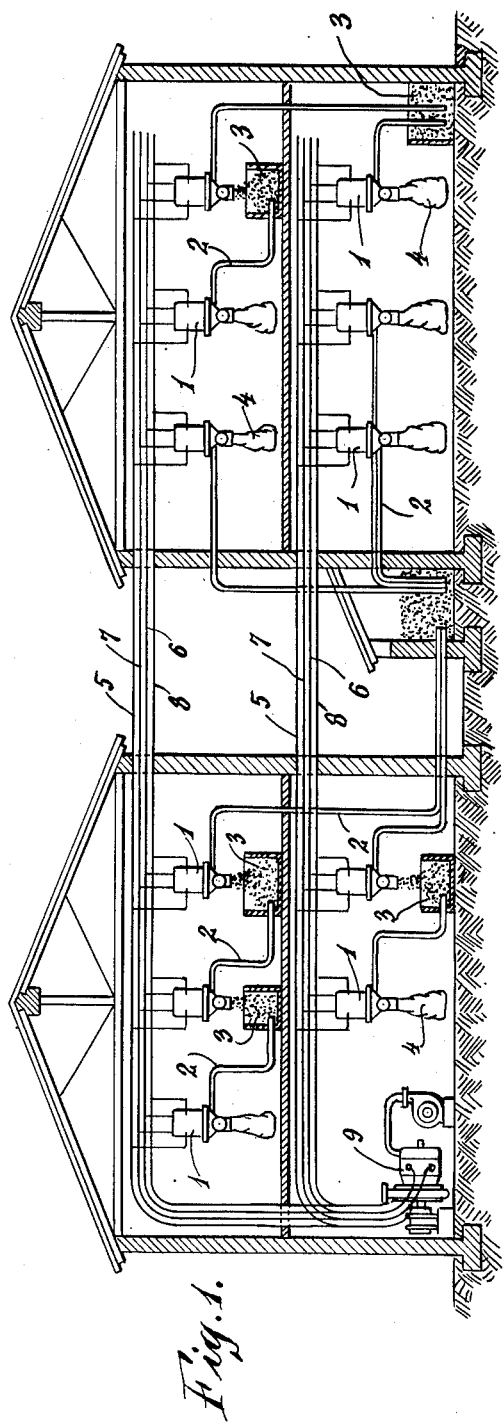
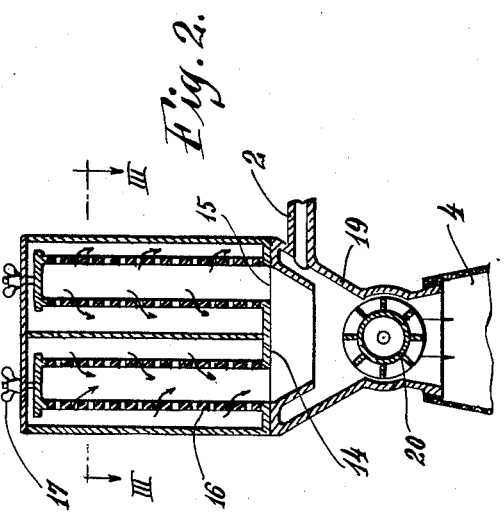
INVENTOR.
LORENZO ANTONELLI
AGENTS April 6, 1954 — L. ANTONELLI — 2,674,342
APPARATUS FOR REVERSE FLOW CLEANING OF FILTERS
Filed March 22, 1951 — 2 Sheets-Sheet 2

INVENTOR.
LORENZO ANTONELLI
By Haseltine, Lake & Co.
AGENTS

Patented Apr. 6, 1954

2,674,342

UNITED STATES PATENT OFFICE 2,674,342

APPARATUS FOR REVERSE FLOW CLEANING OF FILTERS

Lorenzo Antonelli, Milan, Italy

Application March 22, 1951, Serial No. 216,878

Claims priority, application Italy March 30, 1950

5 Claims. (Cl. 183—57)

Filters used for separating solid material from air or other gas, for example in plants for pneumatic transportation of powdery or comminuted materials, are in need of periodical cleaning for detaching the material that has stuck thereto; this is necessary particularly if the filtering walls are made of fabric into the interstices of which the most minute portions of the material conveyed become lodged rendering the filtering walls impermeable in practice, after a comparatively short time. In order to effect said periodical cleaning, recourse is had generally to a mechanical action of deformation of said filtering walls to dislodge the materials deposited thereon.

Such mechanical cleaning devices have been found objectionable because they are complicated, they are costly to operate and maintain and they cause quick wear of the filtering walls, and often cause them to be torn.

It has also been proposed to reverse, after a certain period, the current of air passing through a filter in order to dislodge the material from the filtering wall, followed by reversal of the air flow to again continue the filtering action. This however involves redesigning the construction of the filter and providing it with complex valve systems. The control of such valves then represents a serious problem if the filter is installed in positions accessible only with difficulty or in comparatively narrow spaces.

An object of the present invention is to provide a filtering device comprising at least one filter subdivided into a plurality of chambers each communicating with a filtering wall, with a room where the air or gas to be filtered arrives. Each of said chambers communicates through a corresponding conduit with two valves actuated cyclically to put successively each of said chambers in communication alternately with a zone at super-atmospheric pressure and with a zone at sub-atmospheric pressure as compared with the pressure existing in said room where the air or gas to be filtered arrives.

Another object of the invention is to provide a filtering plant for filtering air or other gases, particularly for the pneumatic transport wherein the filters are not provided with any mechanical member for shaking or deformation of the filtering walls or with any other member for reversing the gaseous stream, so that one needs not contact the filters themselves, either manually or by means of mechanical controls, to clean the filtering walls.

The plant according to the present invention is composed of any number of filters arranged in any manner along a multiple conduit constituted by a nest of pipes, in which plant the cleaning of the filtering surfaces is effected by the action of a plurality of valves placed at the end of said conduit, so that the individual filters are not provided with any particular member destined to provide cleaning thereof. Each of the filters is divided into a number of chambers, each of which communicate through a filtering wall with a room where the air or gas to be filtered arrives; each of said chambers is in communication with one of said pipes, whence if in one of said pipes the current of air is reversed by action of said valves, in each filter there is cleaned the filtering wall of the corresponding chamber, this taking place cyclically for all the pipes and, therefore, for all of the chambers. For this purpose, said valves are two for each pipe and they are controlled in such a manner as to put said pipe alternately in communication with the zone at super-atmospheric pressure and respectively with the zone at sub-atmospheric pressure as compared with the pressure existing in the aforesaid room of each filter, where the air to be filtered arrives.

In order to more clearly describe how the aforesaid plant can be constructed and operated, the following is a description of one form of embodiment illustrated in the accompanying drawing, wherein:

Fig. 1 represents diagrammatically the whole assembly of the plant;

Fig. 2 is an axial section of a filter;

Figure 4:
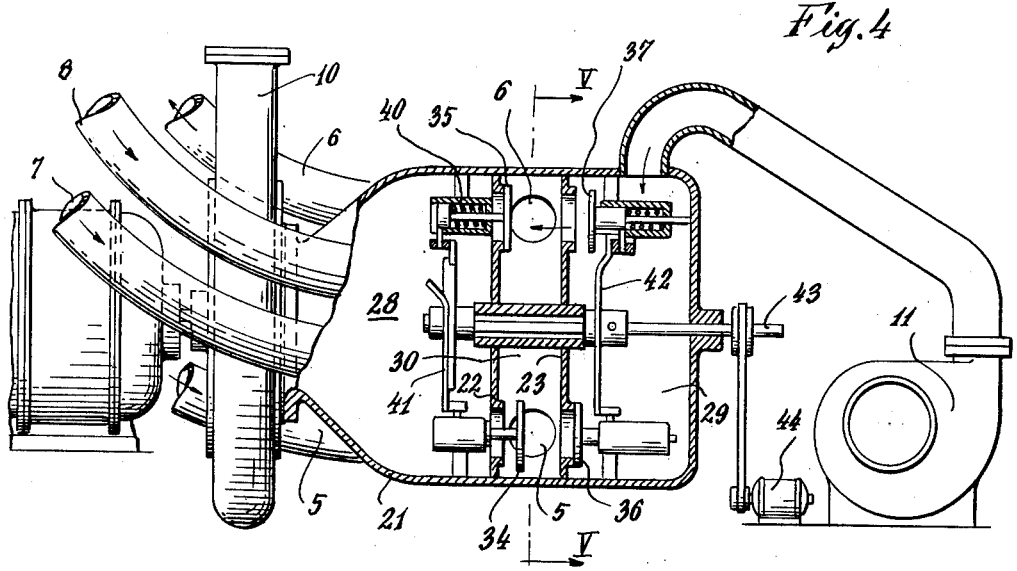
Fig. 4 is a view partly in section, of the apparatus for aspiration and compression of air.

The plant represented in Fig. 1 comprises a certain number of filters 1, through which a gaseous current passes, arriving at the filters through the pipes 2. The gaseous current is composed of air holding in suspension a material in powdery shape or in the shape of light or minute particles, for instance wheat or meal, taken from special containers 3. The filters 1 separate from the air the material conveyed, which falls into the bags 4, while the cleaned air is sucked by the pipes 5, 6, 7, 8 which terminate in a distributor 9 to which are connected the two fans 10 and 11.

Figure 3:
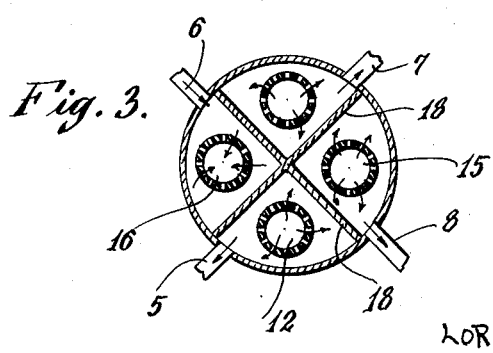
Fig. 3 is a cross section along the line III—III of Fig. 2.

The structure of the filters 1 can be seen more in detail in Figs. 2 and 3. The upper part of the filter is constituted by a cylindrical shell 12 with a cover 13 and a bottom wall. The bottom wall 14 has four holes 15 to which are attached an equal number of fabric hoses 16 anchored to the cover 13 at 17. The space containing these filtering hoses is divided into four parts or chambers by means of baffles 18 in such a manner that each chamber contains one of the aforesaid hoses 16. To each of these four chambers, into which the upper part of the filter is divided, there is connected one of the four pipes 5, 6, 7, 8 mentioned above.

The lower portion of the filter is constituted by a frustoconical shell 19 provided at its lower part with a rotary valve 20 and, thereunder, with means for fastening the mouths of the bags 4.

To the frustoconical shell 19 there is connected the pipe 2 carrying the air to be filtered.

As it will be seen, the filtering hoses 16 constitute a separation between the space enclosed by the shell 19 and containing the air to be filtered, and the upper part of the filter, divided into four chambers, wherein there is the clean air sucked by the pipes 5, 6, 7 and 8.

Figure 5:
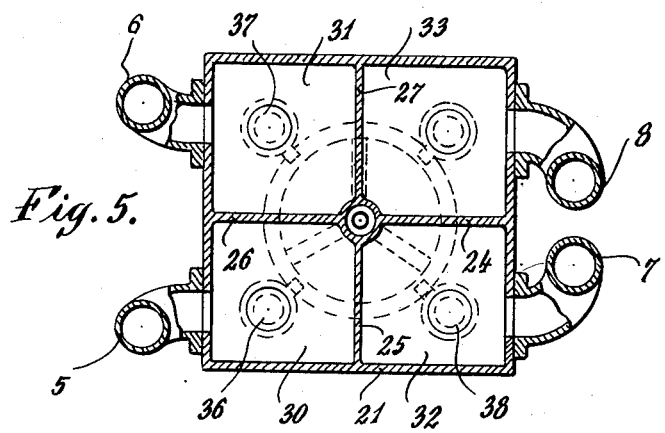
Fig. 5 is a section along the line V—V of Fig. 4.

The pipes 5, 6, 7, 8 terminate in a distributor, which is represented more in detail in Figures 4 and 5. The distributor has a hollow housing 21 divided internally into three chambers by means of the inner walls 22 and 23; the intermediate chamber bounded by the walls 22 and 23 is in turn divided into four compartments by means of the walls 24, 25, 26, 27, which are seen in Fig. 5. The inside of the distributor thus comes to be divided into hollow areas, which are respectively indicated in Figures 4 and 5 with reference numerals 28, 29, 30, 31, 32 and 33. Each of the compartments 30, 31, 32, 33 is in communication with the chambers 28 and 29 by way of two opposite valves; of these eight valves, those marked 34, 35, 36, 37, 38, 39 are visible in the drawing.

The aforesaid valves are held in the closed position by the springs 40 and are controlled to open at determined times by the action of the cams 41 and 42 carried by the shaft 43 rotated by a drive member 44, represented diagrammatically, in Fig. 4.

The pipes 5, 6, 7 and 8 terminate respectively, at the chambers 30, 31, 32, 33; the chamber 28 is in communication with the aspiration mouth of a fan 10, while the chamber 29 is in communication with the delivery mouth of a fan 11.

The cams 41 and 42 are shaped in such a manner as to control the opening of only one valve at a time for each of the chambers 30, 31, 32 and 33, and so as to put only one of the chambers 30, 31, 32 and 33 in communication with the chamber 29, while the other three are in communication with the chamber 28. In other words, each of the chambers 30, 31, 32 and 33 remains in communication with the chamber 28 for the most part of the cycle determined by one turn of the shaft 43, while for one short phase of said cycle, communication with chamber 28 is cut off and communication with chamber 29 is opened; this happens successively for each of the four chambers 30, 31, 32 and 33.

From the above description, the operation of the plant will be easily understood. In Figures 2, 3, 4, 5 there are marked with hatchings the spaces that are subjected to the super-atmospheric pressure generated by the fan 11, while all the other spaces not hatched are at the sub-atmospheric pressure generated by the fan 10.

In the position represented in Figures 2, 3, 4, 5, the fan 10 sucks air from the chambers 30, 32, 33 and thus through the pipes 5, 7 and 8 from three of the top chambers of the filter, taking in air, through the hoses 16, from the room enclosed by the frustoconical shell 19 and thus from the pipe 2, which conveys the air to be filtered loaded with material carried along therewith. The chamber 31, instead, is in communication with the chamber 29 and, therefore, the air blown by the fan 11 enters the pipe 6 and arrives at the fourth chamber of the filter, passing then through the hose 16, in the reverse direction, which causes, with a possible flabbiness of the said hose, the removal, from the inner surface, of the powder that had stuck thereto.

The rotation of the shaft 43 and, consequently, of the cams 41, 42, causes subsequently the closing of the valve 37 and the opening of the valve 35, whence the chamber 31 is no longer in communication with the chamber 29, but is put in communication with the chamber 28 and the fan 10 sucks air also through the pipe 6.

The rotation of the cams 41 and 42 cuts off communication between another one of the inner chambers of the fan, for instance chamber 30, and the chamber 28, closing the valve 34, while the valve 36 is opened, so that the pipe 5 is put in communication with the chamber 29 receiving the air blown by the fan 11, which causes in an analogous manner the cleaning of another one of the hoses 16.

In conclusion, it happens that at regular intervals, preset by the mechanism of the cams 41, 42, each of the hoses of each filter is cleaned by the action of the reverse air pressure that is produced in the pipe terminated at the chamber, in which the hose is placed. This happens contemporaneously for all of the filters and it is interesting to note that the operation of the plant is quite independent of the number of existing filters; in particular the displacement of one or more filters does not involve any necessity of modification of the arrangement or operation of the valves and, if one wishes to add further filters to the plant, it is sufficient merely to connect them to the pipings 5, 6, 7, 8 without any need for intervening in any manner with the prior installation and without installing new valves or modifying those already existing.

In the drawing, the pipes 5, 6, 7, 8 are indicated separately in order to render the drawing explanatory, but since these pipes follow the same path, there is no reason for holding them distinct and they may form one single assembly or unit constituted by an external wall and by inner walls dividing the unit into a number of conduits equal to the number of chambers into which the upper part of each filter is divided.

Other variants may be introduced into the plant, for example the fan 11 may be dispensed with and the chamber 29 may be in communication with the atmosphere or even be dispensed with, so that the valves 36, 37, 38, 39 open the communication of the compartments 30, 31, 32, 33 respectively with the external atmosphere. Or the chamber 29 might be put in communication with the delivery of the fan 11, in which case the need for a fan 11 is eliminated. The filtering surfaces in the aforedescribed example are constituted by fabric hoses, but it is evident that they might be formed in any other manner with any other filtering material, and might be in any number; also the chambers of each filter may be in any number with a corresponding increase or decrease in the number of conduits 5, 6, 7, 8.

Moreover, the driving element 44 may be of any kind and in particular it may consist of a variable speed motor, said speed being adjustable so as to determine the frequency with which the different phases of the cycle follow each other, that is the frequency with which the cleaning operation follows the filtering operations, in relation to the possible variations of quality, quantity and humidity of the material to be separated from the air or gas.

The cams 41, 42 or other equivalent organs may be shaped in the most suitable way for determining the most convenient ratio between the durations of the cleaning phase and filtering phase, and can be made replaceable for varying such ratio according to requirements.

The advantages of simplicity of the plant and comparative cheapness of construction and maintenance, especially when the number of filters is high, are obvious.

Having now particularly described and ascertained the nature of my said invention and in what manner the same is to be performed, I declare that what I claim is:

1. Control apparatus for use with a plurality of filters each of which is divided into a like number of chambers which are in communication, through filter tubes, with a space where air to be filtered enters the filters, said control apparatus comprising a hollow housing, spaced walls within said housing dividing the interior thereof into an intermediate chamber, an end chamber adapted for connection to a source of super-atmospheric pressure and a second end chamber adapted for connection to a source of sub-atmospheric pressure, partitions between said spaced walls dividing said intermediate chamber into a plurality of separate compartments corresponding to the number of chambers of the filters, a pipe extended from each of the compartments of said intermediate chamber and connected to one of the chambers of all of the filters, normally closed valves connecting each of the compartments of said intermediate chamber with said end chambers, and means for cyclically opening said valves for putting successively each of said compartments, and consequently each of said pipes and the chambers of the filters, in communication alternatively with one of the end chambers and the other of the end chambers.

2. Control apparatus according to claim 1, wherein the end chamber having the sub-atmospheric pressure is in communication with the suction port of a fan blower.

3. Control apparatus according to claim 1, wherein the end chamber having the super-atmospheric pressure is in communication with the outlet port of a fan blower.

4. Control apparatus according to claim 1, wherein the end chamber having the sub-atmospheric pressure is in communication with the suction port of a fan blower and the end chamber having the super-atmospheric pressure is in communication with the outlet port of said fan blower.

5. Control apparatus according to claim 1, wherein said valve opening means is driven by an adjustable speed driving means.

References Cited in the file of this patent

UNITED STATES PATENTS

| Number | Name | Date |
|---|---|---|
| 2,391,534 | Yerrick et al. | Dec. 25, 1945 |

FOREIGN PATENTS

| Number | Country | Date |
|---|---|---|
| 441,252 | Germany | Mar. 2, 1927 |